Figure 1:
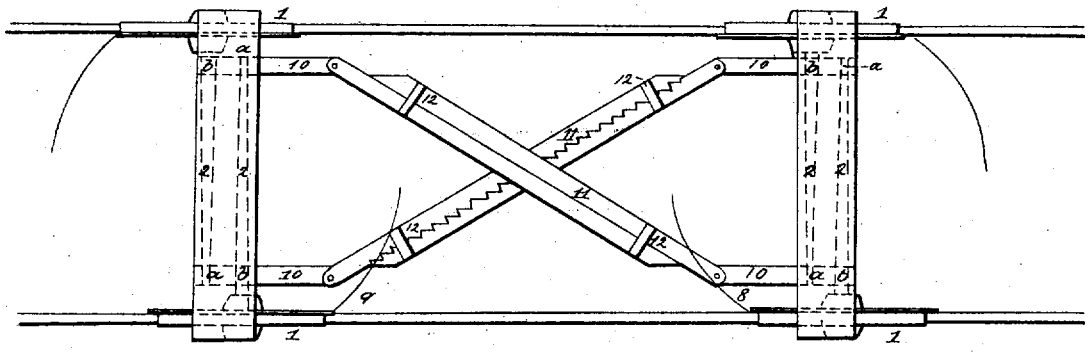
Figure 3:
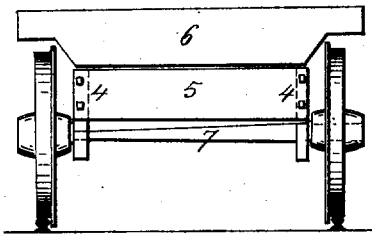
Figure 2:
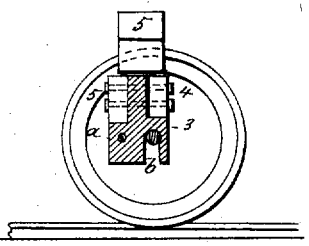

8803X

H. BACHMAN.

Car Truck.

Patented May 2, 1835.

AM. PHOTO-LITHO. CO. N.Y. (OSBORNE'S PROCESS)

UNITED STATES PATENT OFFICE.

8803X

HEINRICK BACHMANN, OF LANCASTER, PENNSYLVANIA.

IMPROVEMENT IN THE CONSTRUCTION OF CARRIAGE-FRAMES FOR RAILWAY-CARS.

Specification forming part of Letters Patent dated May 2, 1835.

*To all whom it may concern:*

Be it known that I, HEINRICK BACHMANN, of the city of Lancaster, in the State of Pennsylvania, have invented a new and useful improvement in the manner of constructing a carriage-frame for railroad-cars of any description, as well as for common wagons or land-carriages; and I do hereby declare that the following is a full and exact description of the construction and operation of the said machine as invented or improved by me, newly invented improvement in the construction of a carriage-frame for railroad-cars of any description, as well as for common wagons or land-carriages, possessing the following advantage of turning a curve with mathematical accuracy.

A train of railroad-cars of any required number can pass a curve of large or small radius drawn to thirty feet with no difference whatever from the facility of forming a straight line and without any more friction taking place at the sides of the rails. Not only the locomotive-power will thereby be greatly facilitated, but the railway will suffer nothing from the powerful friction, which it has now to sustain from the wheels in turning a curve, and may of course be kept in good order much longer, and all danger of the axles of the wheels breaking or bending is done away. By this improvement the wheels are entirely deprived of their tendency to deviate from their proper line and to run off from the railroad. The conical surface need not be resorted to, but the whole periphery of the wheels may run on the rails, and it should become a principal condition that the wheels in order to run easy ought to run exactly at right angles on the rails.

In laying out a new railroad the great advantage is gained that curves need not be so anxiously avoided, whereby many circuitous routes and large expenses may be saved.

All rails in curves as well as in straight lines may be laid duly horizontal. Whereas the easy motion of this newly-invented circular carriage-frame requires that each wheel should perform its rotations independently of the other wheels, since it is well known that in describing any part of a circle the wheels on the inside will not turn around as often as those on the outside, and it being at the same time very desirable, if not absolutely necessary, that the wheels of a railroad-carriage should be fastened to the axles and turn round with them, the plan is here adopted to have two iron axles running within a movable wooden axle-tree lying close to each other, to every one of which a wheel is fastened, the opposite end of the iron axle moving in a socket lined with brass. The hind and front wheels are connected by two guiding-ears crossing each other in their center.

Figure I represents the carriage-frame.

Nos. 1 are the four wheels, and Nos. 2 the four iron axles fastened to the wheels. At their opposite ends *a* they run in iron sockets lined with brass, as is particularly shown in Fig. II.

*a* E is that end of the axle to which the wheel is fastened, where socket is open below, which is closed after the wheel and axle have been fixed in it.

In Fig. II, No. 3 is a strong plate of iron fastened by two screws (see Figs. II and III, No. 4) to the wooden axle-tree No. 5, and containing two sockets for the iron axles to run in, No. 5 being the wooden axle-tree.

No. 6 may be called the "sill," on which the body of the car rests, fastened in the middle by a strong iron pin to the wooden axle-tree in such a manner as to keep the latter movable and to give free scope to its different inclinations.

No. 7, Fig. III, shows the iron axles below the wooden axle-tree. Each of these axles must have a round projection or iron ring welded to it immediately behind that part of the axle which runs in the socket C, thus forming a groove between the projection and that part of the axle to which the wheel is fastened, by which groove firmly moving in the socket C keeps the wheel in its due position.

In Fig. I, No. 10 are two strong iron plates fastened to the wooden axle-trees, and No. 11 are longer guiding-bars connected with these plates by a strong iron pin in such a manner that the guiding-bars can move in any required direction, whereby at the same time the carriage-frame is firmly held together. On common railroad-cars these guiding-ears may consist of a single piece; but if it should be desired to place the wheels farther apart, so as to be able to carry long timber, &c., the guiding-bars may be made of two pieces, fitting into each other by a jagging, which may be lengthened or shortened at pleasure and are held together by iron rings No. 12. The body of the car being taken off, the hind and front wheels may be fixed at any distance, so that timber of one hundred or more feet in length may be transported thereon. By means of these guiding-bars the circular motion of the wheels becomes evident, for whenever any large or small curve is to be passed on the railroad the wheels Nos. 8 and 9 incline toward the center, and the opposite wheels are pushed out by the guiding-bars exactly in the same proportion, describing a regular circle, which may be brought down to such a small radius that even the swivels at the warehouses are no more necessary, but a short curve may lead from the railroad into each warehouse. This circular carriage-frame is equally as applicable to common wagons or land-carriages of any description. As such the frame has only two common axle-trees, the wheels moving on them as usual. Any wagon or carriage constructed on this principle possesses the advantage of turning to the right or to the left without the least inconvenience and with perfect ease in any circle, the hind wheels always running in the track of the front wheels, and the wheels never coming in contact with each other, whereby at least one horse-power is saved and the carriage or wagon kept in good order for a long time. All the wheels are at every moment in instant connection with the shaft, and the hind part of the carriage-frame is much better fastened to the front part than at present. In this drawing (representing the frame of a railroad-car) the wheels are ten feet apart. This would not only give greater elasticity to the car, but the load might be divided to greater advantage, and the car having a larger body would afford more room for the goods.

In testimony that the above is a true specification of my said improvement as above described, I, the said HEINRICK BACHMANN, have hereunto set my hand, at the city of Lancaster, this 20th day of April, A. D. 1835.

HEINRICK BACHMANN.

Witnesses:

SAM DALE,
JOHN BEAR.